United States Patent [19]

Lin et al.

[11] Patent Number: 4,811,115

[45] Date of Patent: Mar. 7, 1989

[54] IMAGE PROCESSING APPARATUS USING APPROXIMATE AUTO CORRELATION FUNCTION TO DETECT THE FREQUENCY OF HALF-TONE IMAGE DATA

[75] Inventors: Ying-Wei Lin, Penfield; Anthony F. Calarco, Fairport, both of N.Y.

[73] Assignee: Xerox Corporation, Stamford, Conn.

[21] Appl. No.: 109,677

[22] Filed: Oct. 16, 1987

[51] Int. Cl.⁴ ............................................... H04N 1/40
[52] U.S. Cl. ..................................... 358/283; 358/280
[58] Field of Search ......................... 358/280, 281, 283

[56] References Cited

U.S. PATENT DOCUMENTS

| | | | |
|---|---|---|---|
| 3,294,896 | 12/1966 | Young, Jr. | 358/283 |
| 4,194,221 | 3/1980 | Stoffel | 358/283 |
| 4,251,837 | 2/1981 | Janeway, III | 358/283 |
| 4,554,593 | 11/1985 | Fox et al. | 358/283 |
| 4,556,918 | 12/1985 | Yamazaki et al. | 358/283 |
| 4,559,563 | 12/1985 | Joiner, Jr. | 358/283 |
| 4,578,714 | 3/1986 | Sugiura et al. | 358/283 |
| 4,651,293 | 3/1987 | Kato | 358/283 |
| 4,701,784 | 10/1987 | Matsuoka et al. | 358/213.17 |

FOREIGN PATENT DOCUMENTS 2153619  8/1985  United Kingdom .

Primary Examiner—James J. Groody
Assistant Examiner—Randall S. Svihla
Attorney, Agent, or Firm—Mark Costello

[57] ABSTRACT

Method and apparatus for processing a stream of image pixel data to determine the presence of high frequency half-tone data. The arrangement applies the function $$\phi(k) = \sum_{l=1}^{L} |f(l) - f(l+k)|$$

to a stream of image pixel data. The presence of minimums of $\phi(k)$ at times indicative of predetermined half-tone image frequencies is detected and an output signal indicative of the presence or absence of minimums at the predetermined half-tone image frequencies is provided. More particularly, the two's complement of the stream of image pixel data is added to each of a plurality of differently delayed signals derived from the original stream of image pixel data. The absolute value is taken of the resulting function. The signal is summed for a selected number of pixels, corrected for noise, and reviewed for minimums. Minimums occurring at selected positions in the pixel stream indicate certain frequencies of the data. An output is created based on frequency indications.

6 Claims, 5 Drawing Sheets $f(l + 4)$ 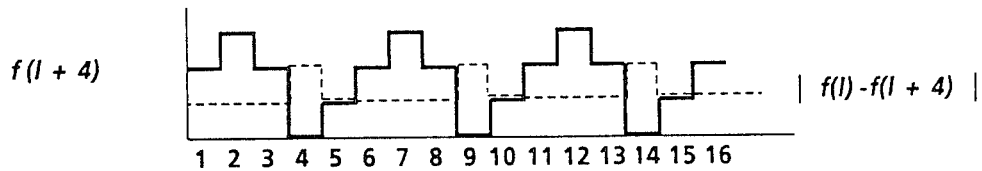 $|f(l) - f(l + 4)|$
FIG. 4(e)
$f(l + 5)$ 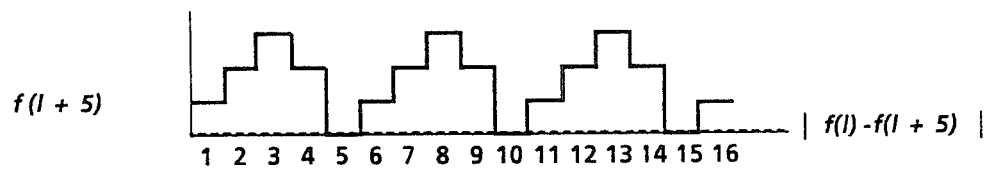 $|f(l) - f(l + 5)|$
FIG. 4(f)
$f(l + 6)$ 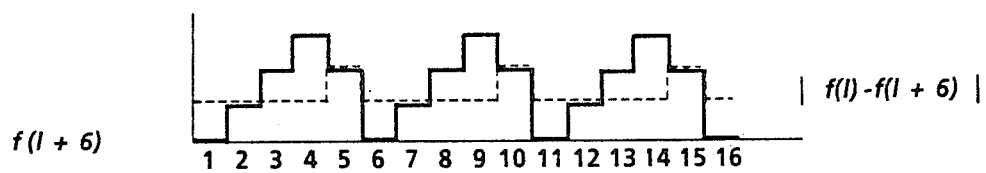 $|f(l) - f(l + 6)|$
FIG. 4(g)
$$\Phi(k) = \sum_{l=1}^{16} |f(l) - f(l+k)|$$
FIG. 4(h)
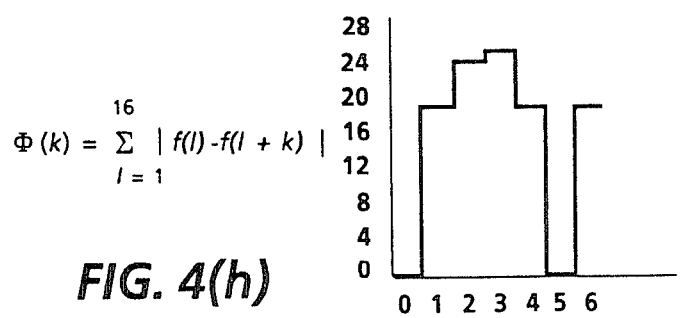

IMAGE PROCESSING APPARATUS USING APPROXIMATE AUTO CORRELATION FUNCTION TO DETECT THE FREQUENCY OF HALF-TONE IMAGE DATA

The present invention relates generally to a system for processing image pixels, and more particularly to the detection of half-tone frequency prior to processing.

INCORPORATION BY REFERENCE

U.S. Pat. No. 4,194,221 to Stoffel is herein incorported by reference to the extent it is applicable for background information.

BACKGROUND OF THE INVENTION

In the reproduction of copies of an original from video image data created, for example, by electronic raster input scanning from an original document, one is faced with the limited resolution capabilities of the reproducing system and the fact that output devices are mostly binary. This is particularly evident when attempting to reproduce half-tones, lines and continuous tone images. Of course, an image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of high frequency half-tones, low frequency half-tones, continuous tones, or line copy, or a combination, in some unknown degree, of some or all of the above. In the face of these possibilities, optimizing the image processing system for one image type in an effort to offset the limitations in the resolution capability of the reproducing apparatus used, may not be possible, requiring a compromise choice which may not produce acceptable results. Thus, for example, where one optimizes the system for low frequency half-tones, it is often at the expense of degraded reproduction of high frequency half-tones, or of line copy, and vice versa.

In U.S. Pat. No. 4,194,221 to Stoffel, this problem was addressed by applying a discrimination function instructing the image processing system as to the type of image data present and particularly, an auto correlation function to the stream of pixel data, to determine the existence of high frequency half-tone image data. Such a function is expressed as:

$$A(n) = \sum_{T=0}^{t=\text{last}} p(t) \times p(t + n) \quad (1)$$

where
n = the bit or pixel number;
p = the pixel voltage value; and
t = the pixel position in the data stream.

Stoffel describes a method of processing automatically a stream of image pixels representing unknown combinations of high and low frequency half-tones, continuous tones, and/or lines to provide binary level output pixels representative of the image. The described function is applied to the stream of image pixels and, for the portions of the stream that contained high frequency half-tone image data, notes a large number of closely spaced peaks in the resultant signal. The correlator circuits described in Stoffel's referred embodiment however, are very expensive, as they must provide a digital multiplication function. Accordingly, as a practical matter, Stoffel requires as a first step, reduction of the amount of data handled, by initially thresholding image data against a single threshold value, to reduce the image to a high contrast black or white image. However, depending on the selection of the threshold as compared to the intensity of the image, significant amounts of information may be lost in the thresholding process. For example, if the threshold level is set to distinguish in the middle of the intensity range, but the image has significant variations through the darker gray levels, the thresholded result does not indicate the variations. This results in an undesirable loss of image information. While it may be possible to vary the threshold value adaptively from original to original and from image area to image area, such algorithms tend to be complicated and work well only for a restricted class of images such as line images.

GB No. 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency half-tone or continuous tone image. The thresholding step in this method has the same undesirable effect as described for Stoffel.

Of the background interest in this area are U.S. Pat. No. 4,556,918 to Yamazaki et al. showing an arrangement assuming a periodicity of an area of half-tone dots which are thresholded against an average value derived from the area to produce a density related video signal; U.S. Pat. No. 4,251,837 to Janeway, III, which shows using a three decision mode selection for determining threshold selection based on gradient constants for each pixel; U.S. Pat. No. 4,578,714 to Sugiura et al. which shows random data added to the output signal to eliminate pseudo-outlines; U.S. Pat. No. 4,559,563 to Joiner, Jr., suggests an adaptive prediction for compressing data based on a predictor which worked best for a previous pixel block; and U.S. Pat. No. 3,294,896 to Young, Jr., teaches the usefulness of thresholding in producing an image from a binary digital transmission system.

SUMMARY OF THE INVENTION

In accordance with the invention there is provided a method and apparatus for applying an auto correlation function for the determination of the presence of high frequency half-tone image data. The auto correlation function is calculated for the stream of half-tone image data at selected time delays which are predicted to be indicative of the image frequency characteristics, without prior thresholding. The arithmetic function used in the inventive auto correlation system is an approximation of the auto correlation function using logical functions and addition, rather than the multiplication function used in U.S. Pat. No. 4,194,221 to Stoffel. Addition is a simpler and faster function to implement in an image processor than multiplication. Minimums in the resulting auto correlated function are detected to determine whether high frequency half-tone image data is present.

In accordance with another aspect of the invention, the applied approximation auto correlation function is given as $$\phi(k) = \sum_{l=1}^{L} |f(l) - f(l+k)|$$

where
k is a selected time delay along the function;
f(l) is the pixel intensity value;
l is is a selected pixel position in the data stream.

In accordance with yet another aspect of the invention, the arrangement for applying the approximation auto correlation function provides a parallel processing arrangement useful in faster processing of image data.

In accordance with another aspect of the invention, while in a preferred embodiment, minimums are detected only in predicted time frame useful in determining whether high frequency half-tone image data is present, extrapolation of the system with an increased number of sample points allows determination of the frequency of the image data for more specific handling of the frequency detected. The invention also finds use in the detection of lower frequency half-tone images.

These and other apsects of the invention will become apparent from the following description used to illustrate a preferred embodiment of the invention read in conjunction with the accompanying drawings in which:

FIG. 1 demonstrates a block diagram of an image data processing system wherein the present invention finds particular use;

Figure 4A:
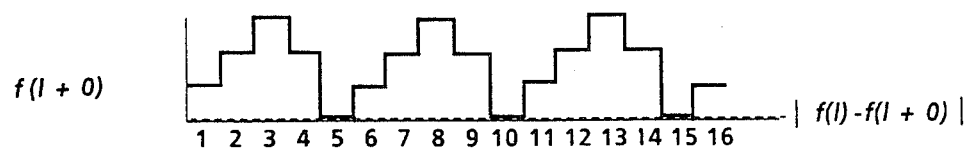
Figure 4B:
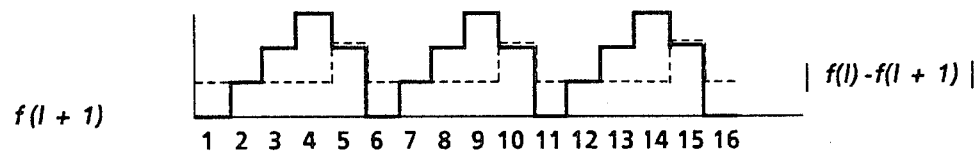
Figure 4C:
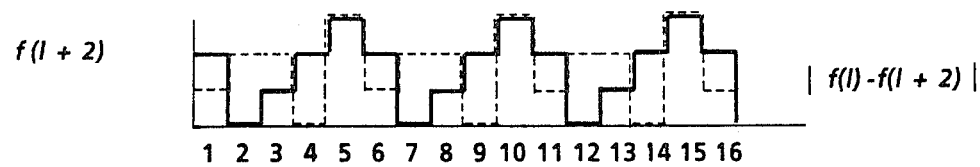
Figure 4D:
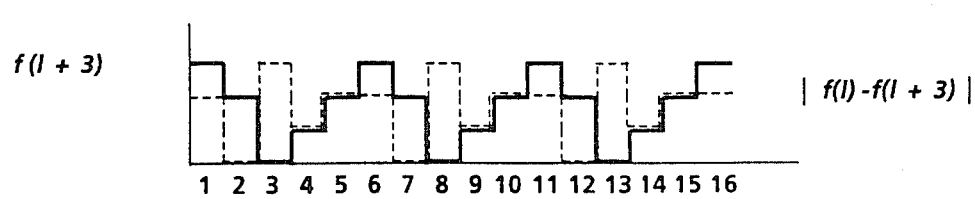

FIGS. 4(a)-4(h) are sample graphs showing the auto correlation function $\phi(l)$ and its derivation from f(l). FIGS. 4(a)-4(g) show $f(l+k_n)$ and $|f(l)-f(l+k_n)|$ for each time delayed pixel, and FIG. 4(h) shows $\phi$ k(l) for the sample function f(l).

Image data in the form of video image data picture elements, (hereinafter, pixels), which may be either analog or digital voltage representations of the image, is provided from a suitable source. For example, the image data pixels may be obtained through line by line scanning of an image bearing original by one or more reflective scanners, such as a multiple element array of charge coupled devices, commonly referred to as CCD's. Line by line scanning of an image bearing original for the derivation of image data is well known and does not form a part of the present invention.

In content, the original may be composed entirely of lines, or low frequency half-tone image(s), or high frequency half-tone image(s), or continuous tone image(s), or combinations thereof. Where the original consists of lines, as for example a typed page, the image pixels may be converted to either one of two voltage levels, one representing non-image or background areas and the other image areas.

A continuous tone image comprises an unscreened image, typically a photograph. When scanned, the voltage values of the pixels produced are representative of the gray levels making up the picture.

A half-tone image, typically a picture or scene, is one which has been reproduced through a screening process. One example is a newspaper picture. The screen used may be either a high or low frequency screen. A high frequency screen is arbitrarily defined herein as one having a frequency of 100 cycles per inch or more, while a low frequency screen is defined as one having a frequency less than 100 cycles per inch. Half-tone images, therefore, comprise a pattern of discrete dots, the frequency of which depends upon the screening frequency used.

Figure 1:
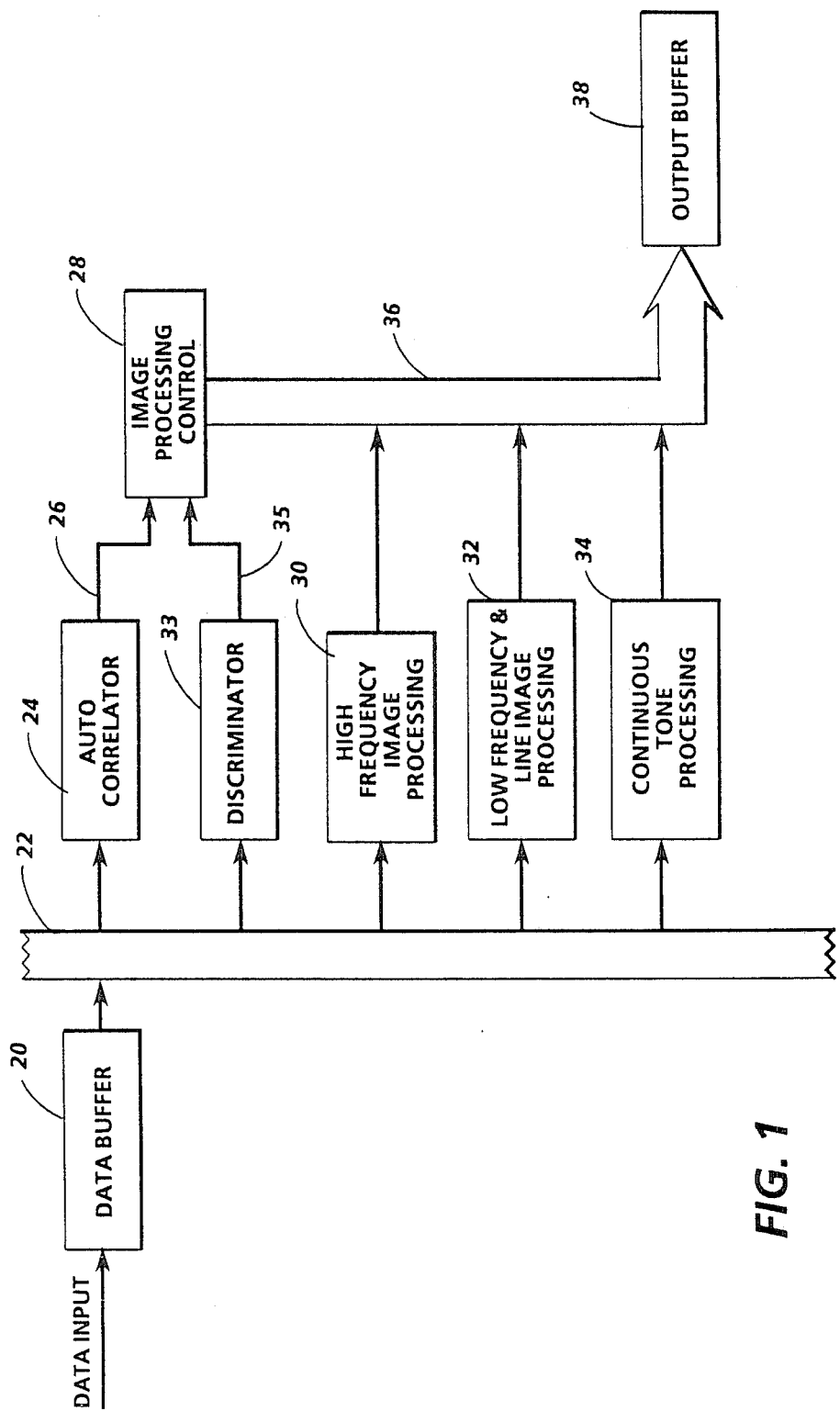

With reference now to the drawings where the showings are for the purpose of illustrating a preferred embodiment of the invention and not for limiting same, in an application incorporating the present invention, such as that described, for example, in U.S. Pat. No. 4,194,221 to Stoffel, FIG. 1 demonstrates handling of image data, which may be derived from any number of sources, including a raster input scanner, a graphics workstation, an electronic memory or other storage element, etc. The stream of image pixels from an image data source is fed to a buffer 20. Buffer 20, which comprises any suitable commercially available serial in/-serial out multi-row buffer having a bit storage capacity sufficient to temporarily store lines of image pixels, permits processing of image data in blocks of several lines.

Image data is made available to the image processing system along data bus 22. Image data at this point is in its raw gray format, for example, 6-8 bits per pixel. To detect the presence of high frequency half-tone image data, a one dimensional block of image pixels is unloaded from buffer 20 onto a data bus 22. The block of image pixels is passed to auto correlator 24 which as will be explained hereinbelow, auto correlates each pixel group in accordance with a predetermined algorithm to determine if the image data is high frequency half-tone or not. An output on line 26 instructs the image processing control 28 to handle the data in accordance with whether high frequency half-tone image data has been detected. A suitable block size is about 16 pixels at a time at 400 spots/inch. Too large a sample size has a tendency to cause a blurred result, while too small a sample size does not contain a large enough amount of data for a good sample of the function. Either case results in inaccuracies in detecting high frequency half-tone image data.

The presence of line copy and/or low frequency image data is determined by discriminator 33. Discriminator 33 functions to produce an output on line 35 indicative of the presence of line copy or low frequency half-tone image data, instructing image processing control 28 to handle data in accordance with therewith.

Image processing control 28 serves essentially as a switch to allow data from the image processing sections, including high frequency image processing section 30, low frequency and line image processing section 32 and continuous tone processing section 34, to flow through bus 36 to an output buffer 38 in accordance with the detection of data in the particular mode. Image processing control 28 controls a data bus 36 to allow data flow from each processing section, in accordance with the signals passed thereto from along auto correlator 24 or discriminator 33. Each processing section processes all image data in accordance with its function, but only that data appropriately processed is allowed to pass to the output buffer 38. Data improperly processed is discarded.

Figure 2:
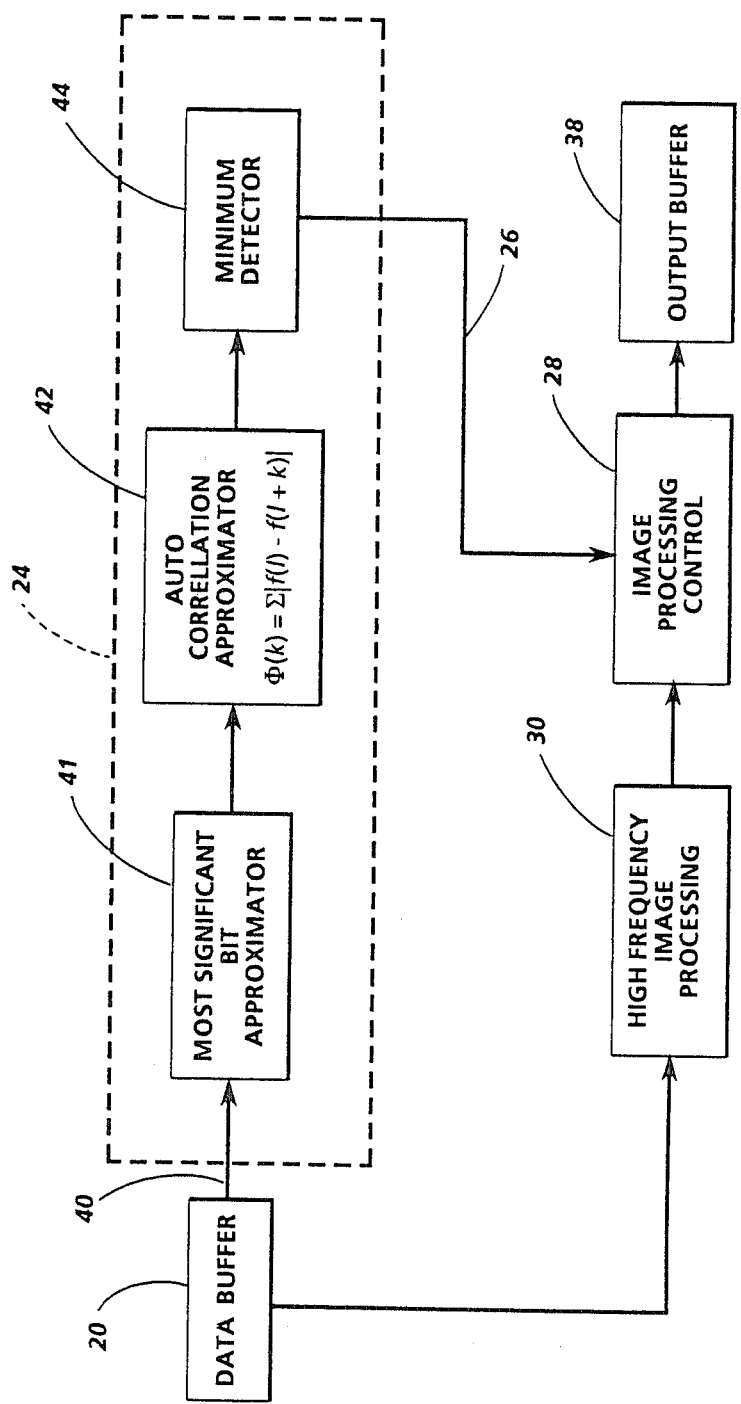
FIG. 2 is a block diagram of the main system elements of the auto correlator of FIG. 1.

Thus far the device has been described along the line taught by U.S. Pat. No. 4,194,221 to Stoffel. In accordance with the invention, as illustrated in FIG. 2, the stream of pixels derived from buffer 20 enters auto correlator arrangement 24 defined by the present invention along line 40. An optional most significant bit approximator 41 may be used to reduce the amount of bits handled by the processing system. For example, the 4 least significant bits in an 8 bit half-tone signal are stripped away from the image data, thereby leaving an approximation of the gray level value accurate to within 16 levels. The image data is then passed to auto correlation approximator 42. The auto correlated function is examined to determine whether minimums have occurred at expected times at minimum detector 44. Detection of high frequency half-tone image data results in a signal being sent along line 26 to image processing control 28. As previously noted, when image processing control 28 is advised that high frequency half-tone images are being processed, image processing control 28 allows the flow of processed data from high frequency image processing section 30 to pass to the output buffer 38.

Figure 3:
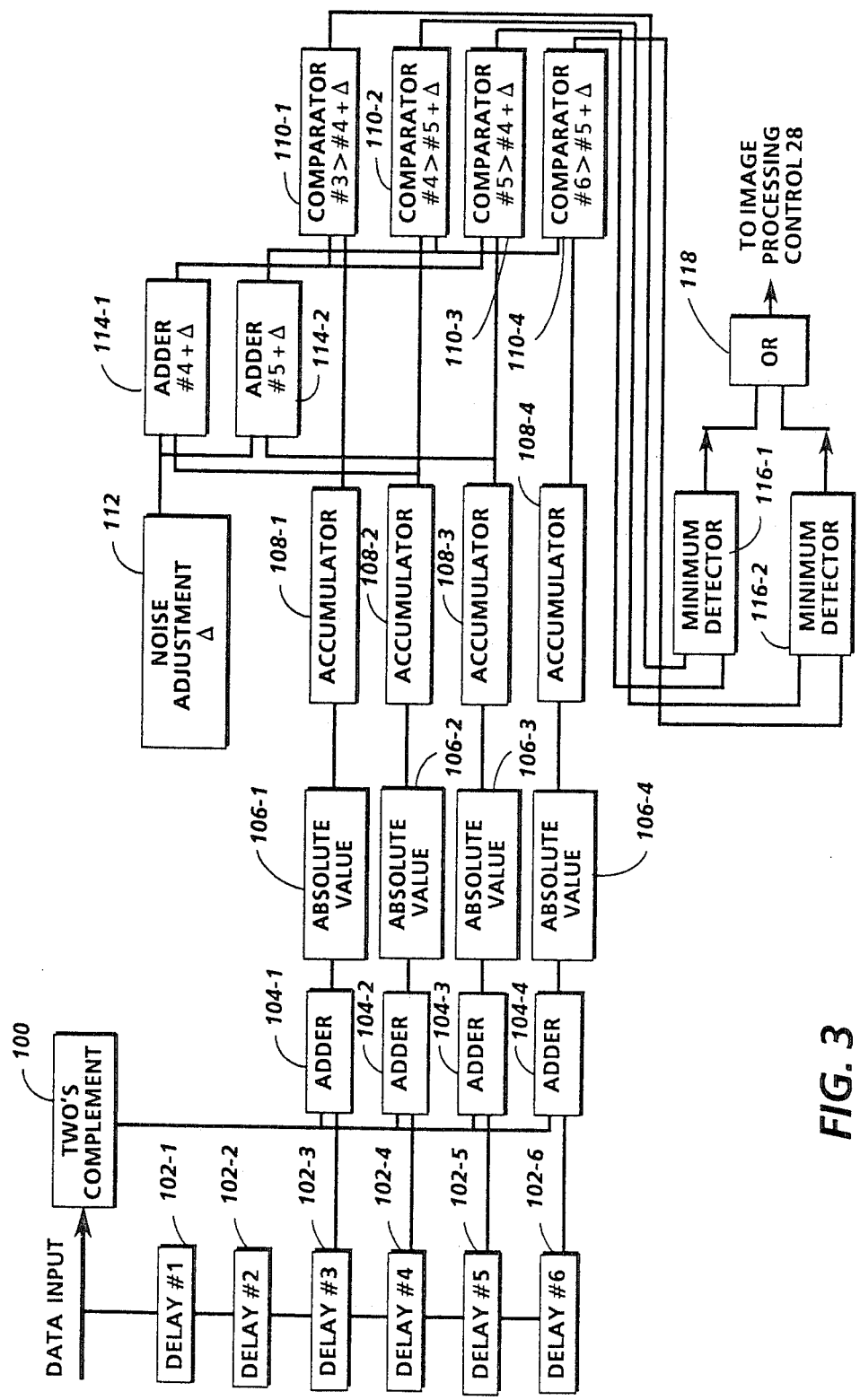
FIG. 3 is a block diagram showing the operational elements of the auto correlation function and minimum detector of FIG. 2.

In accordance with FIG. 3, data input to the auto correlation approximator 42, illustrated for example purposes as only a single data line when in an actual embodiment it would probably be a 4–8 bit signal, is directed in two directions. In the first direction, the function f(l), indicative of the stream of pixels is passed to a two's complement logic device 100, which produces a two's complement function from the original function. Thus, $$f(l) = -f(l) \tag{3}$$

At the same time, the function f(l) is also passed through a series of somewhat standard shift registers 102-1, 102-2 . . . 102-6, which by shifting the signal successively therethrough, add a delay $k_n$ to the signal as the data is passed through each register. Accordingly, the signal becomes at shift register n:

$$f(l+k_n) \tag{4}$$

Each successive delay adds a constant delay $k_n$ to the signal, illustrated in FIG. 3 as simply, examples, 1, 2, 3, 4, 5, 6. While the delays are constant, however, the number of delays is chosen to obtain the shape of the auto correlation function in the region which is predicted to show the frequency characteristics of the signals. The six delays chosen in the present example are only representative of a possible selection, and fewer or greater numbers of delays could be chosen.

The two's complement function, $-f(l)$ and each selected delayed signal, $f(l+k_3)$, $f(l+k_4)$, $f(l+k_5)$, $f(l+k_6)$, selected as representative pixels in the signal, are then added together at adders 104-1 to 104-4 to obtain the function $$-f(l)+f(l+k_n) \tag{5}$$

Data from delays #1 and #2 need not be used, as it reflects pixels too early in the function to be useful in determining frequency of the function.

The absolute value is then taken of the resulting functions at logic devices 106-1, 106-2, 106-3, 106-4 to obtain $$|-f(l)+f(l+k_n)| \tag{6}$$

or $$|f(l+k_n)-f(l)| \tag{7}$$

This function has the benefit of not requiring multiplication which is undesirable in digital data processing.

Values of the terms circulated in equation (7) are accumulated at accumulators 108-1, 108-2, 108-3, 108-4, over for predetermined numbers of pixels in the pixel block, thus providing the function $$\Phi(k) = \sum_{l=1}^{L} |f(l) - f(l + k)| \tag{8}$$

a graph of which appears in FIG. 4, referred to as the measure of the match. From FIG. 4, it can be seen that $\phi(l)$ has the same period as f(l) and has minima at values of $k_n$ such that $f(l)=f(l+k_n)$. In FIG. 4, it will be appreciated that the slight line offset in the graphical showings is for the purpose of clearly showing the functions, and not indicating a difference in values.

Referring again to FIG. 3, when an accumulation of a block of pixels is completed, the value is transferred to comparators 110-1, 110-2, 110-3, 110-4. A noise correction factor may be introduced to the comparison function by adding a noise correction factor $\Delta$ from a reference source 112 to some of accumulated values of pixel blocks, and in the example, pixels #4 and #5, at adders 114-1 and 114-2. These corrected values are then used at the comparators. The comparators compares adjacent samples to determine minimums.

Results from the comparators are examined at minimum detectors 116-1 and 116-2. For example, detection of a minimum at the appropriate position (pixels 4 or 5), indicates high frequency half-tone data (120–150 cycles-/inch at 45° for 400 spots/inch). Detection of the minimum generates a signal for the image processor control 28 to instruct it to allow data processed by the high frequency image processing section to pass to output buffer 38. In the described embodiment, detection of minima at either pixel #4 or #5 produces an output at OR gate 118 indicative of high frequency half-tone information. Accordingly, the minima at pixel 5 in FIG. 4(h) indicates high frequency half-tone information.

It will no doubt be appreciated from the above description that a system tailored to process particular frequencies in particular manners may easily be extrapolated from the above description. Accordingly, by taking a greater number of sample points along the function, with means for detecting minimums at any of the sample points, can be implemented simply by adding further repetitive comparators and minimum detectors. It will also be recognized that the inventive auto correlation system may be useful in a wide variety of image processing arrangements beyond that described in U.S. Pat. No. 4,194,221 to Stoffel.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. A method of processing a stream of image pixels to determine the presence of half-tone images at predetermined half-tone image frequencies, the steps which comprise:

applying to a stream of image pixels the function $$\phi(k) = \sum_{l=1}^{L} |f(l) - f(l+k)|;$$

where
- f(l) represents a pixel intensity function, at any selected pixel position in the stream of image pixels,
- l is a selected pixel position in the stream of image pixels,
- L is the last pixel over which the function $\phi(k)$ is evaluated, and
- k is a selected shift in pixel position applied to the pixel intensity function;

detecting the presence of minimums of $\phi(k)$ at pixel positions indicative of predetermined half-tone image frequencies; and providing an output signal indicative of the presence or absence of minimums of $\phi(k)$ at the predetermined half-tone image frequencies.

2. The method of processing a stream of image pixels as defined in claim 1 and further including:

determining from minimums of $\phi(k)$ detected at a plurality of pixel positions whether half-tone images in the stream of image pixels fall within a predetermined range of half-tone image frequencies.

3. A method of processing image data to determine the presence of high frequency half-tone image data in a stream of image data f(l), said image data being made up of image pixels, the ordered steps comprising:

producing n parallel signals from said stream of image data, each signal produced from said stream of image data being selectively shifted in position by a selected shift value $k_n$ to produce a plurality of parallel signals $f(l+k_n)$;

taking the two's complement of the stream of image data f(l) to derive a signal $-f(l)$;

in parallel, adding the signal $-f(l)$ to each signal $f(l+k_n)$ to derive signals $f(l+k_n)-f(l)$;

in parallel, taking the absolute value of each signal $f(l+k_n)-f(l)$ to derive signals $|f(l+k_n)-f(l)|$;

in parallel, summing the signals $|f(l+k_n)-f(l)|$ over a selected number of pixels in the stream of image data to form a function $\phi(k_n)$;

evaluating the value of $\phi(k_n)$ for each $k_n$ to determine the existence of minimums of $\phi(k)$ at selected pixel positions in the stream of image data, whereby the existence of high frequency half-tone image data is detected; and producing a signal responsive to the existence of high frequency half-tone image data.

4. In an image processing device for processing a stream of image data f(l), said image data being made up of image pixels, in a plurality of modes, said modes including combinations of high frequency half-tone image data, low frequency half-tone image data, line image data or continuous tone image data, an improved arrangement for the detection of high frequency half-tone image data comprising:

parallel signal delay means for producing a plurality of parallel position-shifted signals $f(l+k_n)$ from said stream of image data f(l), each parallel signal produced from said stream of image data being position shifted in position by a selected shift value $k_n$;

means for producing a two's complement of the stream of image data f(l) to derive a signal $-f(l)$;

parallel means for adding the signal $-f(l)$ to each position-shifted signal $f(l+k_n)$ to derive signals $f(l+k_n)-f(l)$;

parallel means for taking the absolute value of each signal $f(l+k_n)-f(l)$ to derive signals $|f(l+k_n)-f(l)|$;

parallel accumulating means for summing the signals $|f(l+k_n)-f(l)|$ over a selected number of pixels in the stream of image data to form a function $\phi(k_n)$;

comparator means for evaluating the value of $\phi(k_n)$ for each position shift $k_n$ to determine the existence of minimums of $\phi(k)$ at selected pixel positions in the data stream, corresponding to selected half-tone image frequencies of interest, whereby the existence of high frequency half-tone image data is detected; and means for producing a control signal responsive to the existence of high frequency half-tone image data to control processing thereof.

5. The image processing device as defined in claim 4, and further including a most significant bit approximator for reducing a number of bits forming each pixel of the image data by a selected number of bits prior to the detection of high frequency half-tone image data.

6. The image processing device as defined in claim 4 wherein said parallel delay means includes n shift registers connected for successive storage of the stream of image data f(l) to produce a position-shifted signal $f(l+k_n)$ for each of said n registers.

* * * * *